US 8,441,365 B2

(12) United States Patent
Jones et al.

(10) Patent No.: US 8,441,365 B2
(45) Date of Patent: May 14, 2013

(54) SECURITY SYSTEMS AND METHODS FOR CONTINUOUSLY MONITORING THE WEIGHT OF A CONTAINER AND DETERMINING A MONETARY VALUE OF THE MATERIAL THEREIN

(75) Inventors: David H. Jones, Hawthorne, CA (US); Douglas A. Kunnel, Irvine, CA (US)

(73) Assignee: MJK Holding, LLC, Dover, DE (US)

( * ) Notice: Subject to any disclaimer, the term of this patent is extended or adjusted under 35 U.S.C. 154(b) by 12 days.

(21) Appl. No.: 13/523,254

(22) Filed: Jun. 14, 2012

(65) Prior Publication Data

US 2012/0268273 A1   Oct. 25, 2012

Related U.S. Application Data

(63) Continuation of application No. 12/435,207, filed on May 4, 2009, now Pat. No. 8,203,459, which is a continuation-in-part of application No. 11/948,821, filed on Nov. 30, 2007, now Pat. No. 8,194,129.

(60) Provisional application No. 60/903,000, filed on Feb. 21, 2007.

(51) Int. Cl.
*G08B 21/00* (2006.01)

(52) U.S. Cl.
USPC ............................. 340/666; 340/541; 705/414

(58) Field of Classification Search .................. 340/540, 340/568.1, 666, 541; 235/375–385; 414/21; 209/3.2; 705/16–22, 414
See application file for complete search history.

(56) References Cited

U.S. PATENT DOCUMENTS

| | | | |
|---|---|---|---|
| 4,285,426 A | 8/1981 | Cahill | |
| 4,463,844 A | 8/1984 | Huffman et al. | |
| 4,819,015 A | 4/1989 | Bullivant et al. | |
| 5,150,101 A | 9/1992 | Goris et al. | |
| 5,229,749 A | 7/1993 | Yenglin | |
| 5,235,325 A | 8/1993 | McCaughan, Jr. | |
| 5,285,860 A | 2/1994 | Wirth | |
| 5,478,974 A | 12/1995 | O'Dea | |
| 5,596,179 A | 1/1997 | Sakaeda | |
| 5,780,782 A | 7/1998 | O'Dea | |
| 5,814,771 A | 9/1998 | Oakes et al. | |
| 5,837,945 A | 11/1998 | Cornwell et al. | |
| 5,917,159 A | 6/1999 | Kostiuk | |
| 6,176,774 B1 | 1/2001 | Filiberti et al. | |
| 6,177,876 B1 | 1/2001 | Krueger | |
| 6,580,037 B1 | 6/2003 | Luke | |
| 6,657,547 B2 | 12/2003 | Ching-Yao | |
| 6,970,094 B2 | 11/2005 | Yamashita et al. | |
| 6,983,883 B2 | 1/2006 | Ridling | |
| 7,780,081 B1 | 8/2010 | Liang | |
| 2002/0022968 A1 | 2/2002 | Shimada et al. | |

(Continued)

FOREIGN PATENT DOCUMENTS

| KR | 2003003979 A | 1/2003 |
|---|---|---|
| KR | 0408385 Y | 2/2006 |
| KR | 20060113231 A | 11/2006 |

OTHER PUBLICATIONS

PCT Search Report dated Apr. 28, 2008 as issued by the Korean Patent Office for PCT application PCT/US2007/025581.

*Primary Examiner* — Jeffery Hofsass
(74) *Attorney, Agent, or Firm* — Steptoe & Johnson LLP

(57) ABSTRACT

Various embodiments disclosed herein are directed to weight monitoring systems for recovering, processing, monitoring, and managing various commodities or products stored in a container.

6 Claims, 12 Drawing Sheets

U.S. PATENT DOCUMENTS

| | | |
|---|---|---|
| 2003/0004751 A1 | 1/2003 | Ng et al. |
| 2003/0061084 A1 | 3/2003 | Menninger |
| 2003/0172013 A1 | 9/2003 | Block |
| 2004/0206759 A1 | 10/2004 | Busch |
| 2005/0077352 A1 | 4/2005 | Gudbjartsson |
| 2005/0145693 A1 | 7/2005 | Baitz et al. |
| 2006/0238346 A1 | 10/2006 | Teller |
| 2007/0052586 A1 | 3/2007 | Horstemeyer |
| 2007/0079804 A1 | 4/2007 | Nakayama |
| 2007/0227784 A1 | 10/2007 | Gudbjartsson et al. |
| 2007/0299686 A1 | 12/2007 | Hu et al. |
| 2008/0035727 A1 | 2/2008 | Stanzel et al. |
| 2008/0042842 A1 | 2/2008 | Ulibarri |
| 2008/0296374 A1 | 12/2008 | Gonen et al. |
| 2008/0297346 A1 | 12/2008 | Brackmann et al. |

SECURITY SYSTEMS AND METHODS FOR CONTINUOUSLY MONITORING THE WEIGHT OF A CONTAINER AND DETERMINING A MONETARY VALUE OF THE MATERIAL THEREIN

CROSS-REFERENCE TO RELATED APPLICATIONS

This application is a continuation of U.S. patent application Ser. No. 12/435,207 filed May 4, 2009, which is a continuation-in-part of U.S. patent application Ser. No. 11/948,821 filed Nov. 30, 2007, now U.S. Pat. No. 8,194,129 issued Jun. 5, 2012, which claims the benefit of U.S. Provisional Application No. 60/903,000 filed on Feb. 21, 2007, both of which are hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This description is related to weight monitoring systems and related methods.

BACKGROUND

With the increasing value of commodities such as precious metals, oil, gas, or grains, monitoring and verifying the weight of these commodities is increasingly important. Accordingly, various types of scales have been developed to obtain the weight of the contents of a container. However, scales and other similar devices have limited functionality since these devices provide little to no security for the contents of the container. For example, unscrupulous individuals may add ballast to increase the weight of the container's contents to allegedly increase the value of the container's contents. Alternatively, individuals may remove items from the container's contents. Accordingly, there remains a need for devices and systems for monitoring a container's contents.

SUMMARY

Briefly, and in general terms, various embodiments are directed to a weight monitoring system for recovering, processing and monitoring various commodities or products stored in a container. In one embodiment, the weight monitoring system includes a container having an identification tag provided on a surface of the container, a support device for receiving the container, a weight monitoring system, and a security system for monitoring the container. The weight monitoring system also includes a plurality of load sensors coupled to the support device, in which the plurality of load sensors monitors any weight variance of the container.

In another embodiment, a weight monitoring system includes a system for processing a material and storing the material within a secured container. The weight monitoring system also includes a system for monitoring a weight of the secured container as the processed material is placed within the secured container. The weight monitoring system further includes a computer system in communication with the weight monitoring system, in which the computer system is adapted to generate an invoice based on the weight of the processed material within the secured container prior to removing the secured container from the weight monitoring system.

In yet another embodiment, the weight monitoring system includes a system for processing and loading a material into a secured container. The weight monitoring system also includes a system for detecting weight variances of the processed material placed within the secured container. A web interface is also in communication with the weight monitoring system, in which the web interface is capable of obtaining a current value of the processed material. A computer system is also in communication with the weight monitoring system and the web interface. The computer system is adapted to assign and book a current monetary value to the processed material stored within the secured container.

In another embodiment, a weight management system includes a weight monitoring system in communication with a central monitoring system. The weight monitoring system measures a weight of a secured container at a remote site, and the weight monitoring system transmits the weight of the secured container to the central monitoring system. The central monitoring system dispatches pickup of the secured container when a predetermined percentage of a weight capacity of the secured container is achieved.

In addition to weight management systems, various methods for securely recovering materials are disclosed herein. According to one method, a secured container is locked onto a weight monitoring system having a plurality of load sensors for monitoring weight variances of the secured container. The secured container is identified, and the tare weight of the container is also obtained. A recovery transaction is then initiated. An alert is sent to one or more designated parties in response to a detected variance in container weight that is outside a predetermined weight variance during the recovery transaction. When the recovery process is terminated, recovery data is transmitted to one or more designated parties, in which the recovery data includes, at a minimum, data related to the weight of the material contained within the secured container. Additionally, a party is then invoiced based on the recovery data.

Another method is directed to realizing assets for a company. According to one method, a secured container having a tare weight is locked onto a weight monitoring system. The weight monitoring system includes a plurality of load sensors for obtaining and monitoring a weight of the secured container. A recovery transaction is initiated, and scrap metal is recovered from a site. The recovered scrap metal is then stored in the secured container. A net weight of the stored scrap metal in the secured container is obtained, and a value of the scrap metal is calculated. The value of the scrap metal is based upon the net weight of the scrap metal and a monetary value of the scrap metal per unit of weight. Once the value of the scrap metal is calculated, the value of the scrap metal is booked as an asset of the company.

Another method is directed to managing one or more containers located at one or more remote sites. In one method, a secured container having a tare weight is locked onto a weight monitoring system. The weight monitoring system includes a plurality of load sensors for obtaining and monitoring a weight of the secured container. The weight monitoring system is also in communication with a central management server. The container is identified at the remote site, and the weight of the container is monitored. A message is transmitted to a central management server when the weight of the container contents reaches a predetermined weight. Pickup of the container is scheduled in response to the transmitted message, and a designated party is invoiced based on the weight of the container once the container is transported away from the remote site.

Other features and advantages will become apparent from the following detailed description, taken in conjunction with the accompanying drawings, which illustrate by way of example, the features of the various embodiments.

DETAILED DESCRIPTION

Various embodiments are directed to a weight monitoring system that monitors the contents of a container in order to prevent any tampering altering of the container's contents. For the sake of brevity, the weight monitoring system will be discussed in terms of recovering and securing scrap metal. However, it is contemplated that the weight monitoring system may be utilized for any product or commodity in which a product's value is based on weight. For example, the weight monitoring system may be used in monitoring weight of fluids such as, but not limited to, crude oil or gasoline. The weight monitoring system may also be used to monitor the weight (or variances in the weight) of any commodity or product in which the value is weight-based.

Figure 1:
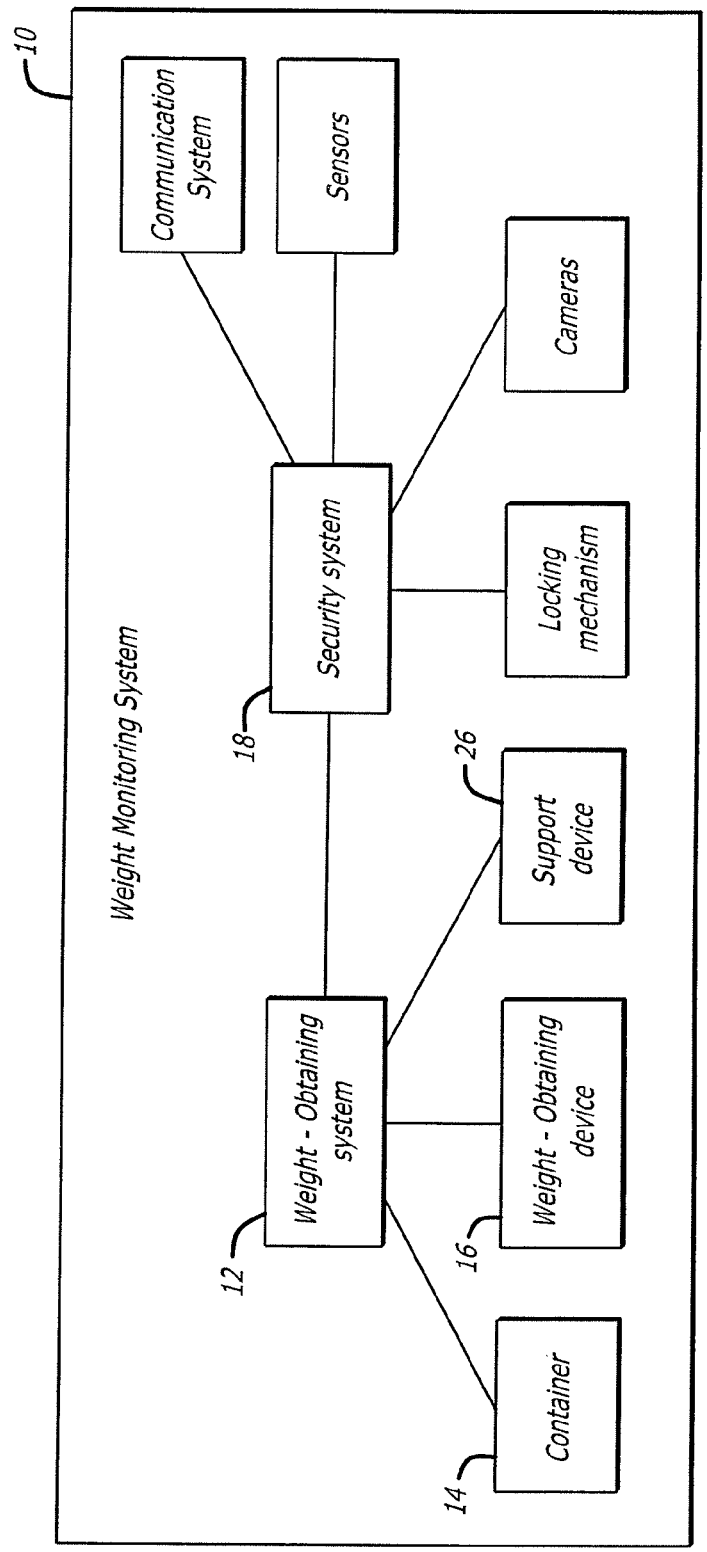
FIG. 1 is a block diagram of one embodiment of a weight monitoring system.

Referring now to the drawings, wherein like reference numerals denote like or corresponding parts throughout the drawings and, more particularly to FIG. 1, there is shown one embodiment of a weight monitoring system 10 having a weight-obtaining system 12 and a security system 14. Generally, the weight monitoring system 10 uses a secured container 14 to ensure that the container's contents are not readily accessible. In one embodiment, the weight obtaining system 12 includes a container 14 and a weight-obtaining device 16 such as, but not limited to, a scale, one or more load sensors, or weighing devices known or developed in the art. In one embodiment, the security system 18 includes, by way of example but not by way of limitation, a locking mechanism to secure the container to the weight-obtaining system 16, one or more cameras, and/or one or more sensors.

Figure 2:
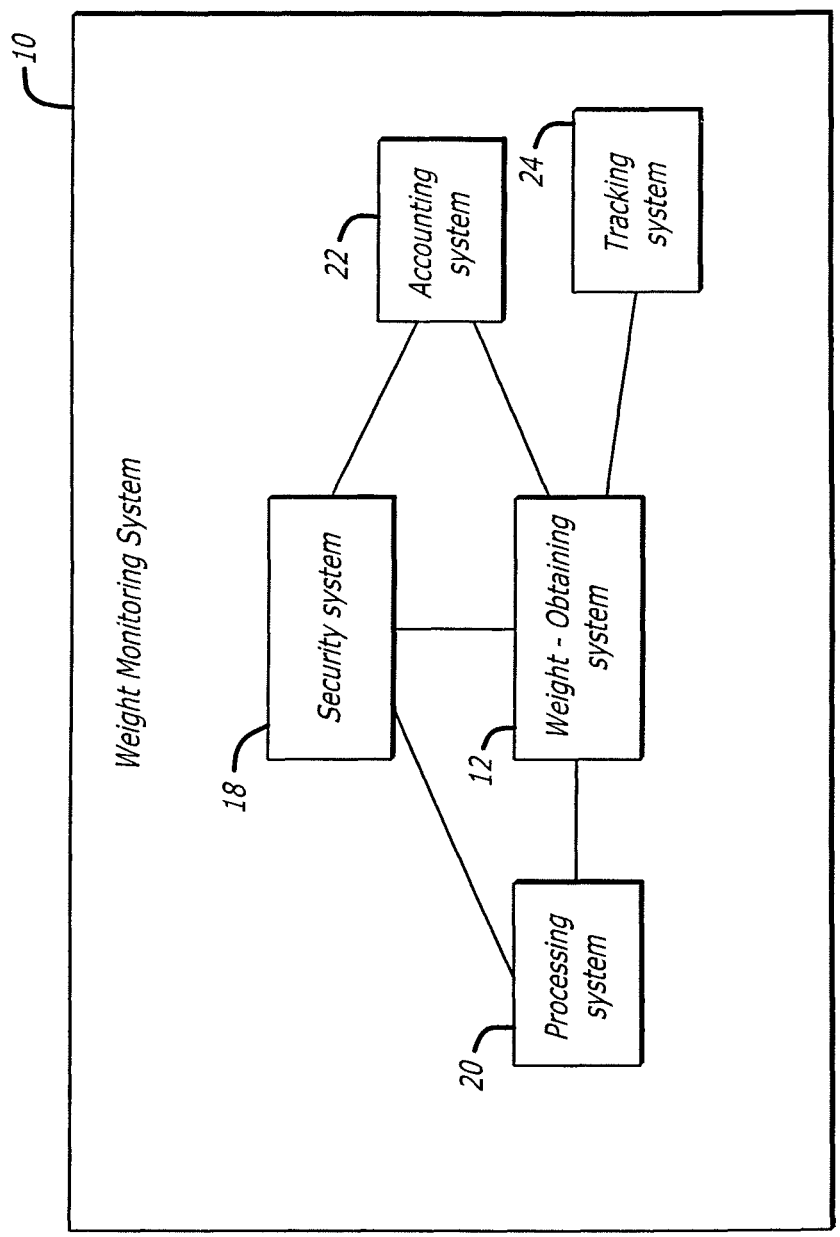
FIG. 2 is a block diagram of another embodiment of a weight monitoring system.

As shown in FIG. 2, the weight monitoring system 10 may include additional systems for carrying out additional functions. For example, the system 10 includes a processing system 20 for converting unprocessed scrap metal into a final, processed material. The processing system 20 may include one or more devices for cleaning, shredding, crushing, pucking, or baling the scrap metal before it is placed within a secured container 14. Additionally, the weight monitoring system 10 may also include an accounting system 22 for booking assets, invoicing parties, and other accounting/data collection functions. In yet another embodiment, the weight monitoring system 10 includes a tracking system 24 for managing the transportation of the containers. In one embodiment, the weight monitoring system 10 is a self-contained system having its own power supply. For example, the weight monitoring system 10 may have its own generator and/or one or more batteries. Alternatively, the weight monitoring system 10 may include solar panels and/or wind turbines for generating electricity.

Figure 3A:
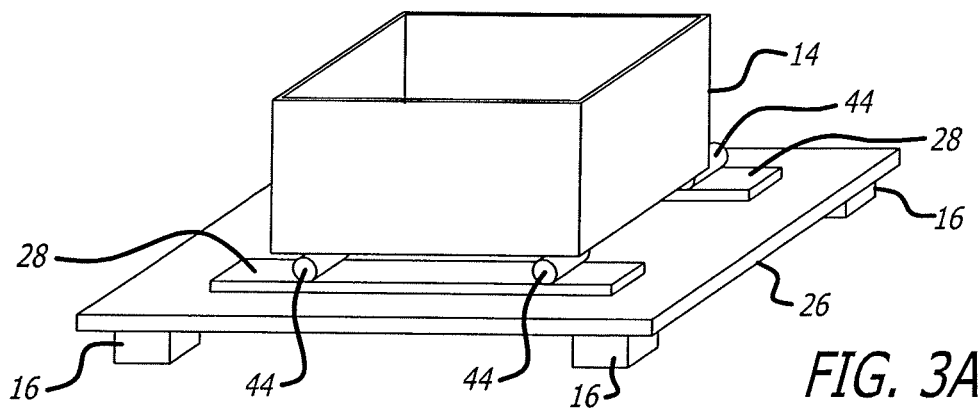
FIGS. 3A-3D illustrate various embodiments of a weight-obtaining system.
Figure 3B:
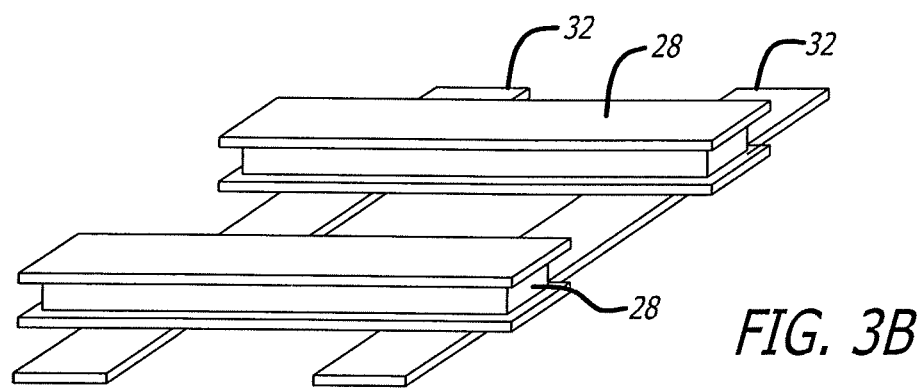
Figure 3C:
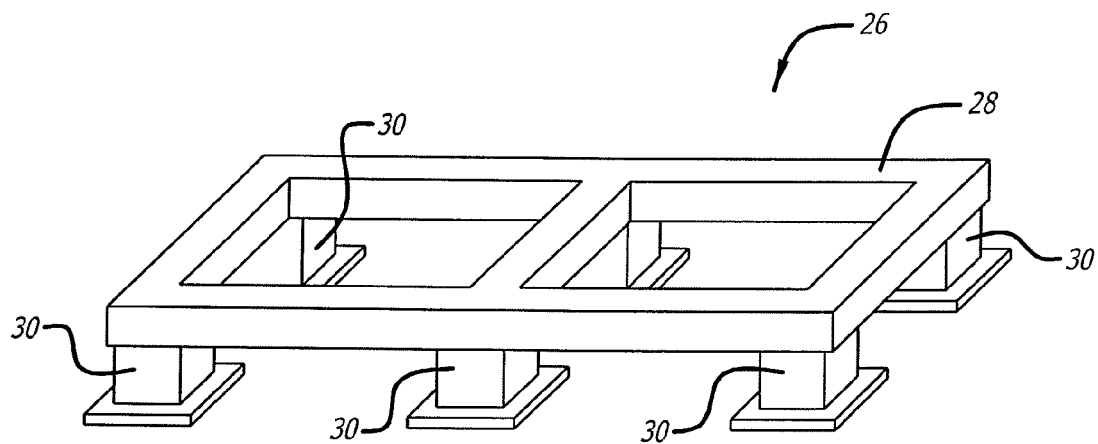
Figure 3D:
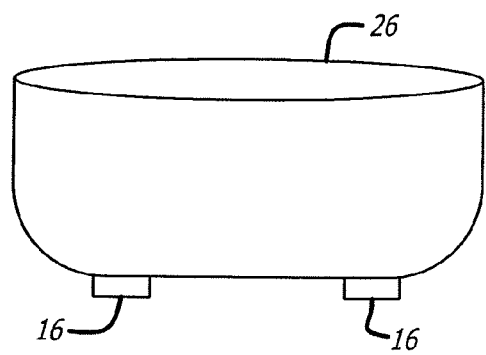

FIG. 3A illustrates one embodiment of a weight monitoring system 10 having a support surface 26 for receiving a container 14 and a plurality of weight-obtaining devices 30 positioned below the support surface. In one embodiment, the support surface 26 is a generally flat platform that is sized to receive a container 14. The platform may include one or more slots, grooves, recesses, locks, hooks, elevated or recessed rails, or similar devices to secure the container to the platform surface. As shown in FIG. 3A, the support surface 26 includes a pair of elevated rails 28 for engaging a container's rollers or wheels. As those skilled in the art will appreciate, the rails 28 are sized and spaced to receive a container 14. In one embodiment, the rails 28 are provided on an adjustable platform 32 so that distance between the rails may be varied to accommodate containers 14 of different sizes as shown in FIG. 3B. In yet another embodiment, the rails 28 are directly fixed to the ground as shown in FIG. 3C. In other embodiments, the support surface 26 may be shaped or take the form of a container, tray, and/or bowl as shown in FIG. 3D.

As shown in FIGS. 3A-3D, a plurality of load sensors 30 are placed below the support surface 26, below the elevated rails 28, or between the support surface and the elevated rails. The plurality of load sensors 30 are used to obtain the weight of the container 14 as well as any scrap metal placed within the container. As shown in FIG. 3A, the load sensors 30 are positioned at opposite ends of each rail 28. In other embodiments, the load sensors 30 may be positioned at the middle of the rails 28. In yet another embodiment, four load sensors 30 are positioned at the four corners of the support surface 26. In yet another embodiment, a single load sensor 30 is placed in the middle or center of the support surface 26. As those skilled in the art will appreciate, any number of load sensors 30 may be used to obtain the weight of the container 14 and the container's contents.

Additionally, the load capacity and sensitivity of the load sensors 30 may be varied depending upon the weight and capacity of the container 14. For example, more sensitive load sensors 30 may be used for lower weights and/or smaller variations in weight. Alternatively, more robust load sensors 30 may be used to obtain the weight of large shipping or roll-away containers 14. In yet another embodiment, the weight-obtaining device 16 may use a combination of sensitive and robust load sensors 30. Depending on the application, the load sensors 30 may also be weight certified or non-certified sensors.

In one embodiment, the weight-obtaining system 12 may also include a drive mechanism for loading a container 14 onto and/or off the support surface 26. The drive mechanism may be a chain-driven, screw-driven, rack and pinion, or winch system. The drive mechanism may be hand-powered or may be powered by electric, pneumatic, hydraulic, or internal combustion motors. Optionally, the drive mechanism may include one or more gears and/or a transmission.

Figure 4A:
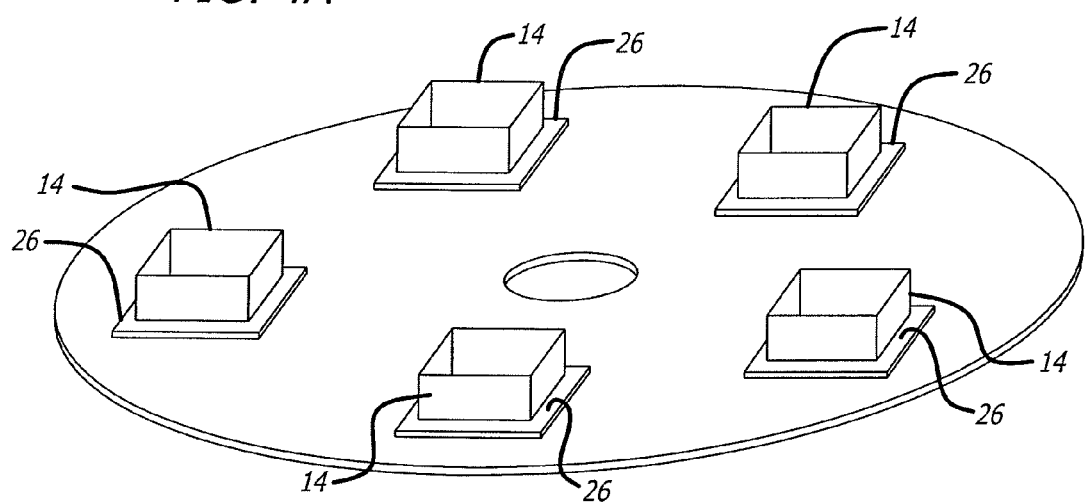
FIGS. 4A-4B illustrate alternate embodiments of a weight-obtaining system.
Figure 4B:
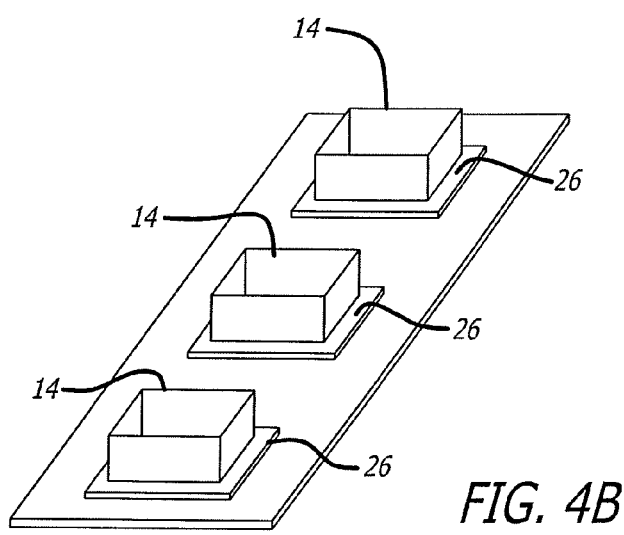

As shown in FIGS. 3A-D, the weight monitoring system 10 includes a single support surface 26. In another embodiment, the weight monitoring system 10 has a plurality of support surfaces 26 for engaging and securing a plurality of containers 14. As shown in FIG. 4A, the plurality of support surfaces 26 may be arranged in a carousel fashion. Alternatively, the plurality of support surfaces 26 may be arranged in a linear fashion as shown in FIG. 4B. In one application, the plurality of containers 14 may be used to load different types of materials (e.g., individual container for titanium, aluminium, and steel). Alternatively, the multiple containers 14 may be used to increase capacity to store recovered scrap metal (as well as recovery efficiency) by eliminating the need to remove a full container 14 from the support surface 26 and subsequently load an empty container onto the support surface.

Figure 5A:
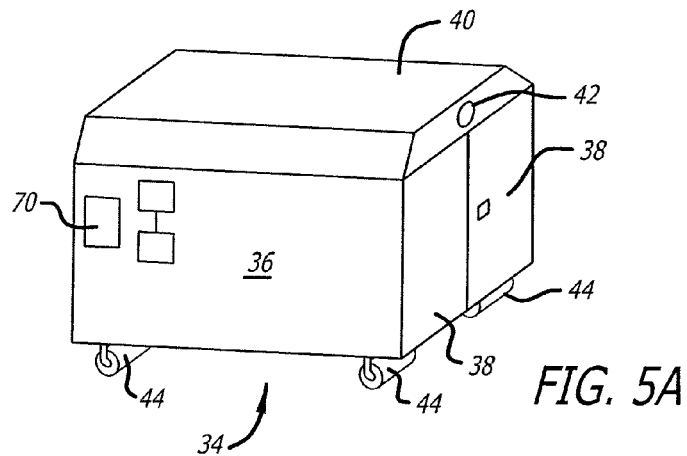
FIGS. 5A-5C illustrate various embodiments of container usable with a weight monitoring system.

According to one embodiment, the support surface 26 and/or rails 28 are sized to receive industry standard roll-off containers. In another embodiment, the weight monitoring system 10 is capable of receiving smaller bins in a wide variety of sizes and configurations. The containers 14 are generally rectangular in shape having a bottom surface 34 and at least one wall 36 that defines an area capable of holding solid and/or semi-solid materials, or fluids. As shown in FIG. 5A, the container 14 includes a bottom surface 34 and four walls 36. Optionally, the container 14 includes one or more doors 38 for accessing the contents of the container. The doors 38 may include mechanical locks, electronic locks, combination locks, cylinder locks, or any other lock known or developed in the art. In yet another embodiment, the container 14 includes a top 40 secured to the four walls 36. In one embodiment, the top 40 of the container includes an opening 42 for receiving material. Optionally, the opening 42 may be reversibly sealed with a lid, plug, or other device for limiting access to the contents of the container 14. The lid or plug may be pivotally coupled to the top 40 so that the lid covers the opening 42 in a first position and exposes the opening in a second position. Alternatively, the lid or plug may be welded or otherwise secured over the opening 42 of the top 40.

Figure 5B:
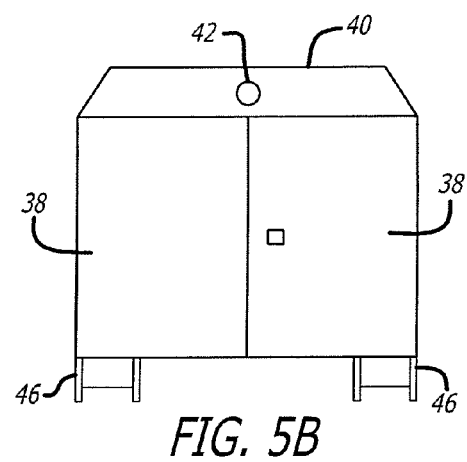
Figure 5C:
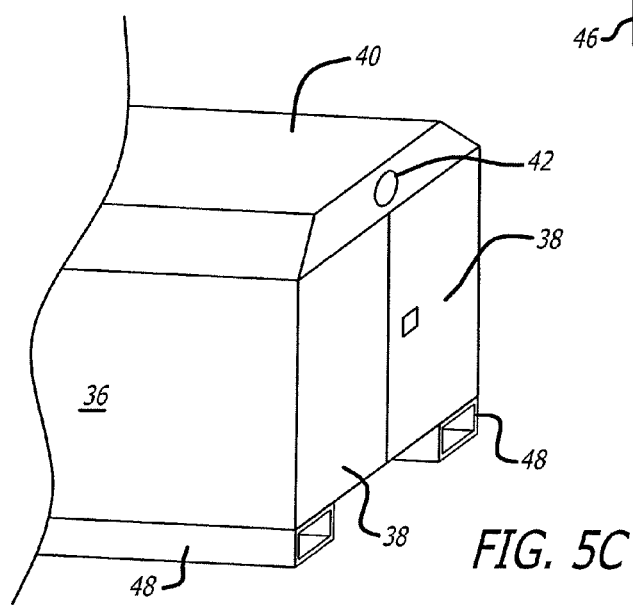

In various embodiments, the container 14 may include one or more rollers 44 rotatably coupled to the bottom of the container for moving the container (e.g., loading or unloading the container onto or off a weight monitoring system or a truck). Alternatively, the container 14 includes one or more rails 46 coupled to the base of the container 14 as shown in FIG. 5B. In another embodiment, one or more pockets 48 for moving and/or lifting the container 14 as shown in FIG. 5C.

As shown in FIG. 5A, the container 14 also includes an identification tag 50 located on one or more of the outer surfaces of the container. The identification tag 50 may include a bar code, color code, or numerical code, alphanumeric code, or other forms of identifying an object known and developed in the art. In one embodiment, the tare weight of the container 14 is also provided on the identification tag 50. In another embodiment, the identification tag 50 also includes a radiofrequency tag (RFID). The RFID may contain information about the container size, container capacity, tare weight of the container, origin, manufacturer name, or other information that a user may desire to store or associate with the RFID. In another embodiment, the identification tag 50 may also be associated with or include a global positioning system (GPS) receiver.

Referring back to FIGS. 1-2, the weight monitoring system 10 includes a security system 18. The security system 18 includes one or more devices to prevent the removal of the container 14, scrap metal from the container, or contamination of the scrap metal stored in the container. In order to prevent the removal of the container 14 from the weight monitoring system 10, the support surface 26 includes a locking mechanism to secure the container 14 to the support surface. The locking mechanism may be a wheel block or a wheel chuck that is secured to the support surface 26 by a mechanical lock, electronic lock, combination lock, cylinder lock, or any other lock known or developed in the art. In another embodiment, the drive mechanism that is used to position the container 14 on the support surface 26 may include a driveshaft lock or other lock that prevents the movement of the container. In yet another embodiment, the lock mechanism is a pivotable hook that engages a portion of the container 14 such as, but not limited to, a lip of the container, an opening on the bottom of the container, or container rail 46. In another embodiment, the security system 18 controls or activates a brake mechanism associated with the rollers 44 of a container. The brake mechanism may be a simple brake shoe that contacts the rollers 44. Alternatively, the brake mechanism is a drum or disc brake associated with the rollers 44.

In another embodiment, the security system 18 includes one or more devices for monitoring the weight-obtaining system 12 and, optionally, the area surrounding the weight-obtaining system. The security system 18 may periodically or continuously monitor a container 14 locked to the support device 26. The security system 18 monitors the container 14 so that there is no unauthorized removal of scrap metal from the container. Additionally, the security system 18 may be used to ensure that no unwanted material (e.g., ballast or fluids) is added to the container 14 (and thereby unscrupulously increase the weight and "value" of the container's contents).

According to one embodiment, the security system 18 includes one or more cameras (photographic and/or video) that are positioned around the container 14 and/or weight-obtaining system 12. In another embodiment, one or more motion detection sensors are positioned around the container 14. The motion detectors may be in operable communication with lights or an audible alarm. In yet another embodiment, the security system 18 includes one or more cameras and one or more motion detector sensors. The security system 18 may be set at any particular times (e.g., after work hours, weekends, when the device is not in use, or the like). In the event that there is an intrusion into the container or a predefined area surrounding the container, visual and/or auditory warnings are emitted. Optionally, the security system 18 may generate a message (e.g., email, text message, or phone call) that is also sent to one or more designated individuals when the security system is tripped. The electronic message may also include a photograph or video footage of the intrusion.

In another embodiment, the security system 18 includes features that limit access to a control panel and/or computer system that is associated with the weight monitoring system 10. For example, the security system 18 may include card access locks that require a key card to access a computer system, release the container 14 from the support device 26, or activate the weight-obtaining system 12. It is also contemplated that the key cards have different levels of access. For example, a machine operator may only be able to access the computer system to initiate the weight monitoring and/or scrap metal recovery process whereas a manager may have a key card that gives the manager the rights to unlock the container 14 from the support device 26 or access the computer system to generate reports or invoices.

Alternatively, a personal identification number (PIN) or other challenge and response system may be used to gain access to the control panel and/or the computer system. In another embodiment, the security system 18 includes biometric devices for identifying an individual via fingerprints, iris scans, retinal scans, facial recognition, hand geometry, hand veins, finger veins, facial thermograms, odor or scent, palm prints, footprints, or any combination thereof. Alternatively, the security system 18 includes devices to detect behavioral biometric data such as, but not limited to, an individual's signature, keystroke dynamics, voice recognition, or any combination thereof.

Optionally, the security system 18 may also include a communication system 54. The communication system 54 may be used to send messages or alerts to the local authorities or designated individuals in the company in response to a security breach detected by the security system 18. The communication system 52 may include a computer, a phone line, wireless hardware, and/or network hardware to transmit voice and/or electronic messages (e.g., emails, text messages, picture messages, video messages, or the like). Alternatively, the security system 18 may utilize the communication equipment that is associated with a computer system of the weight monitoring system 10.

Additionally, the security system 18 may be used during the scrap metal recovery process. For example, the security system 18 may be used to verify the identity of the container by reading the identification tag 50 or RFID associated with the container 14. Alternatively, the security system 18 may take a photographic or video image of the identification tag 50. The photographic or video image may then be compared against a company's records to verify the container's identity. Additionally, the security system 18 may be used to compare the listed tare weight of the container to the actual weight of the container. In the event there is a discrepancy between the tare weight and the actual weight of the empty container, the container may be flagged for further follow-up. Optionally, a message is sent to one or more designated individuals in response to the container discrepancy.

The security system 18 may be used to detect irregular weight changes and signal an appropriate response such as, but not limited to, emitting an audible signal, alarm, or calling or sending a message to the appropriate individuals. For example, a dramatic weight loss, which may be indicative of someone stealing material from the container 14, may trigger a message to be sent to the local authorities as well as the designated individuals in the company. Alternatively, the message or signal may be emitted in response to an abnormal jump in the weight of the container's contents. For example, during the scrap metal recovery process, a dramatic rise in the weight of the container as compared to the filling rate of the container may be indicative of an individual adding ballast or fluids into the container to increase the weight of the container.

In yet another embodiment, the security system 18 also includes an emergency shut-off switch. The switch may halt the recovery process in response to a security breach, natural disaster (e.g., earthquake, hurricane, flood), or an onsite injury.

Figure 6A:
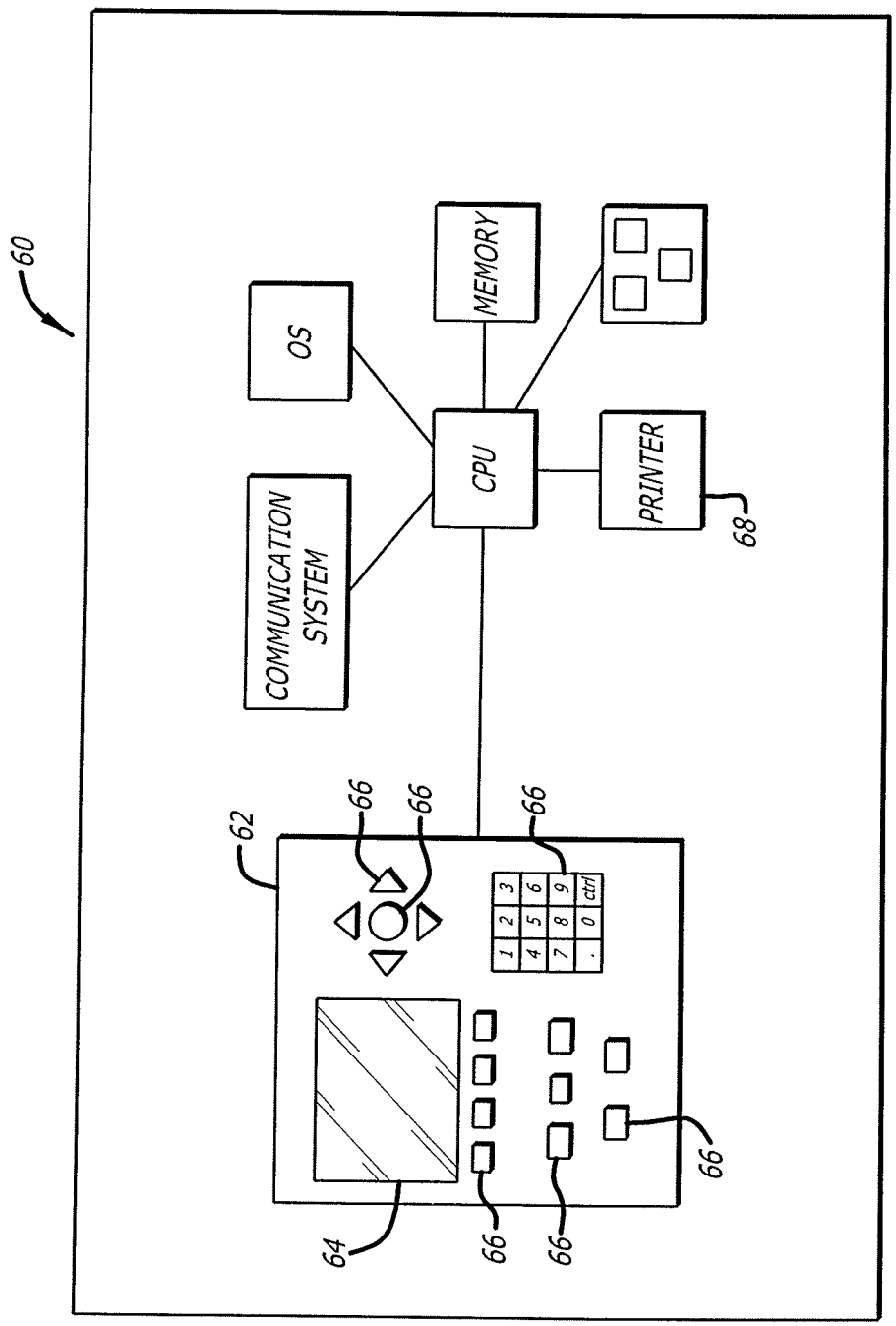
FIG. 6A is a block diagram of a computer system for one embodiment of a weight monitoring system.

In addition to the weight-obtaining system 12 and the security system 18, the weight monitoring system 10 includes a computer system 60. As shown in FIG. 6, the computer system 60 includes a user interface 62 having a display 64 such as, but not limited to, a cathode ray tube, liquid crystal display, or other display device. The user interface 62 also includes one or more input mechanisms 66 such as, but not limited to, a keyboard, keypad, one or more buttons, mouse, trackball, touch screen, touch glass, or other user input device known or developed in the art. The computer system 60 further includes a computer processing unit, memory, operating system, and one or more software programs. The operating system may be Windows-based, Linux-based, Unix-based, a Mac operating system, or other operating systems known or developed in the art.

In one embodiment, the computer system 60 has wireless and/or wired communication capabilities with an onsite or offsite network. The communication capabilities allow the computer system 60 to receive updates, reprogramming, diagnostics, maintenance, or any combination thereof. The communication capabilities also allow the computer system 60 to send data to one or more designated parties, computer systems, or other networks. Any messages or packets of information sent over the network may be encrypted using a rotating algorithm, changing random keys, RSA, hashing, or other encryption techniques known or developed in the art. In one embodiment, the computer system 60 has a data storage unit (e.g., one or more servers) that is remote (e.g., a separate onsite and/or offsite location) from the computer system.

Figure 7:
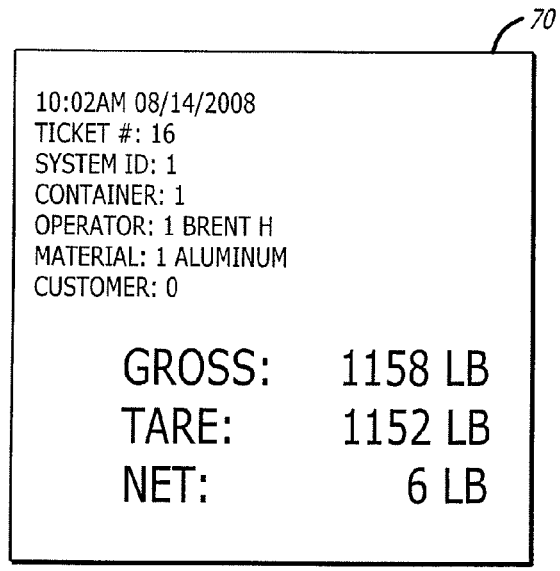
FIG. 7 is a front view of one embodiment of a label generated by the weight monitoring system.

The computer system 60 may also include one or more printers 68 for generating reports, invoices, or labels. In one embodiment, a printer 68 is associated with the user interface 62 and is local to the weight-obtaining system 12. A printer 68 may also be remotely located on the backend of the computer system 60. As shown in FIG. 7, the label 70 may include information such as, but not limited to, container identification, user identification, weight monitoring system identification, time and date stamps, identification of material (e.g., aluminium, platinum, crude oil, or the like) tare weight, gross weight (container and material weight), and net weight. The label 70 may also include bar codes or other machine readable code that represents the information printed on the label.

The computer system 60 includes a user interface 62 that may be local to the weight-obtaining system 12. For example, the user interface 62 may be positioned near the support surface 26. In another embodiment, the computer system 60 and the user interface 62 are located remotely from the weight-obtaining system 12. For example, the computer system 60 may be located in another location in the same facility or the computer system is located at a different facility. The computer system 60 is generally in communication with all the components of the weight monitoring system 10. Alternatively, the computer system 60 may only be in communication with the components of the weight-obtaining system 12.

Figure 6B:
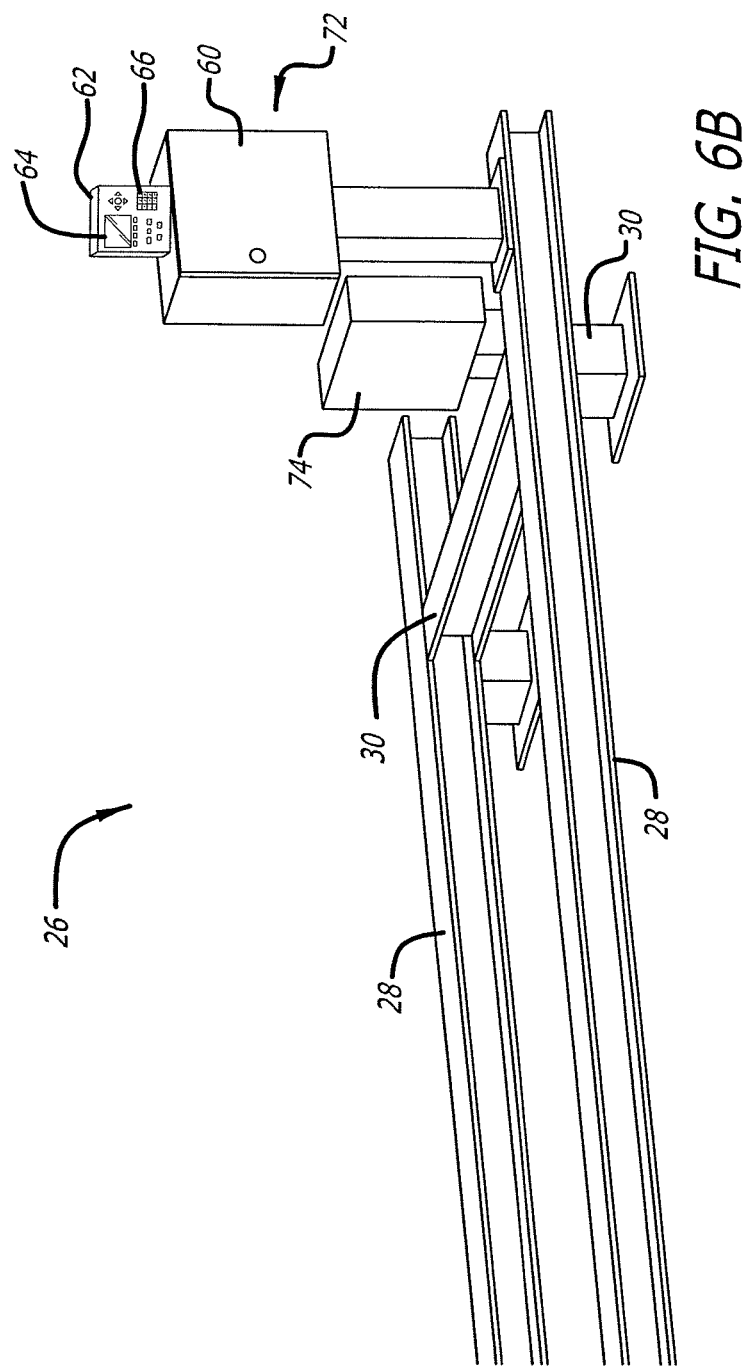
FIG. 6B is a perspective view of one embodiment of a computer system associated with one embodiment of a weight monitoring system.

In those embodiments in which the computer system 60 is local to one or more of the components or systems of the weight monitoring system 10, a secure housing 72 for weather protection and to prevent unauthorized access to the computer system as shown in FIG. 6B. Optionally, the computer system 60 as well as the other components of the weight monitoring system 10 include a dedicated power supply 74 to prevent the system from being defeated, disabled, or tampered with by cutting the power supply. Additionally, a dedicated power supply 74 allows the weight monitoring system 10 to be self-contained as well as portable.

Since the computer system 60 is in communication with the load sensors 30 of the weight monitoring system 10, the computer system can send alerts (e.g., email, text message, voice message, instant message) when a particular net weight is achieved or if a weight imbalance is detected within the container 14. Additionally, the computer system 60 may send a message to designated individuals prior to a weight limit being achieved in order to prevent overloading of the container 14. Accordingly, the designated individuals may take steps to halt the loading of items into the container 14. In another embodiment, the computer system 60 remotely locks the doors 28 of the container 14 to prevent further access or overloading of the container. In another embodiment, the computer system 60 activates a mechanism to cover the top of the container 14 to prevent any additional items to be placed within the container.

Figure 8:
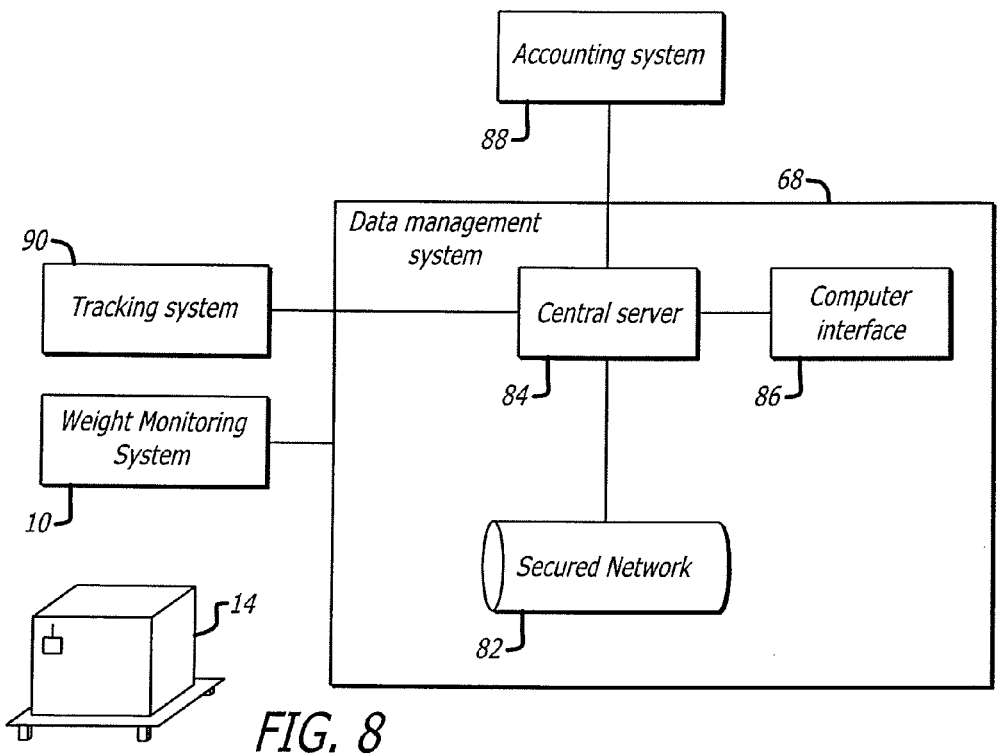
FIG. 8 is a block diagram of a data management system used with a weight monitoring system.

In another embodiment, a data management system 80 is in communication with the various components of one or more weight monitoring systems 10 as shown in FIG. 8. The data management system 80 includes a secure network 82, a central server 84, and one or more user interfaces 86 in communication with the central server. Alternatively, the data management system 80 may utilize the user interface 62 or computer associated with the computer system 60. The network 82 may be an Ethernet network, Wi-Fi network, or other networks known or developed in the art.

The data management system 80 may periodically request or receive weight information from a weight monitoring system 10. Alternatively, the data management system 80 will receive weight information related to a particular container 14 when the container 14 has achieved a predetermined weight, reached a particular capacity level (e.g., 80% of container's maximum capacity), when the container is full, or any combination thereof. Additionally, data may be automatically sent to the central server 84 when the container 14 is removed from the support device 26. In addition to weight information, the data transmitted may also include the container identification, user identification, weight monitoring system identification, time and date stamps, type of material stored in the container, or any combination thereof.

Optionally, data is not only sent to the central server 84, but the data is also sent to designated people such as, but not limited to, account manager, floor supervisor, one or more principals, executives, or the like. The designated recipients may be added or removed through the central server 84. The data is sent in the form of an email, text message, voice message, instant message, or other forms of data communication known or developed in the art. The data transmissions to the central server 84 and the designated party may be encrypted and authenticated using known techniques in the art.

The data transmissions may also be sent to other systems in communication with the central server 84 such as, but not limited to, accounting 88 or tracking 90 systems. When the accounting system 88 receives a data transmission, the accounting system may generate an invoice that is sent to the intended recipient of the container 14. The invoice is based upon the net weight of the container 14 as it leaves the weight monitoring system 10, thereby resulting in an accurate and verifiable price that is priced by a pre-arranged formula. According to one embodiment, the price of the material per weight is agreed upon prior to recovery of the material. In another embodiment, the price of the material is obtained by using selected indices posted on a website or a designated database. Accordingly, a vendor or supplier may request that the recovery process terminate before the container is full to take advantage of a high price of the collected materials.

Another embodiment of the weight monitoring system 10 may include a tracking system 90 for tracking a container 14. In one embodiment, the container 14 includes a global positioning receiver for identifying the location of a container 14. Accordingly, a service provider or dispatcher can follow the location of the container 14. Additionally, a warning may be sent to the dispatcher in the event the container 14 has been diverted from a predetermined route. Thus, the dispatcher may take the necessary steps to determine the cause of the diversion.

The tracking system 90 may also be used to manage the various containers 14 that a service provider may have out in the field. The tracking system 90 is able to send a message to the dispatcher that the container 14 has reached a predetermined weight, thereby signalling the dispatcher to schedule a pickup of the container. In one embodiment, the tracking system 90 includes software that will obtain the weight of the containers out in service and establish a pick-up schedule based upon the rate that the containers are being filled (e.g., rate of weight gain on a daily or hourly basis). The weight data obtained by the tracking system 90 may be sent to a trucking and/or container company to ensure that a truck having the proper weight capacity is used to pick up the filled container 14. Additionally, the weight data may be used to notify the trucking company that a larger or smaller container may be needed on site. For example, if containers are typically overloaded or under utilized, a larger or smaller container 14 may be brought to the site when the full container is hauled away from the site.

When the containers are picked up, the net weight of the container's contents and pickup data (e.g., time and date, location, truck driver, status of container (i.e., damaged)) may be transmitted to the central server. Optionally, the containers used with the tracking system 90 may also include one or more load sensors 30 that can detect if there is a load shift (outside of an allowable norm) in the container 14. If a load shift has occurred, the tracking system 90 may send a message to the driver of the vehicle as well as the dispatcher.

Figure 9:
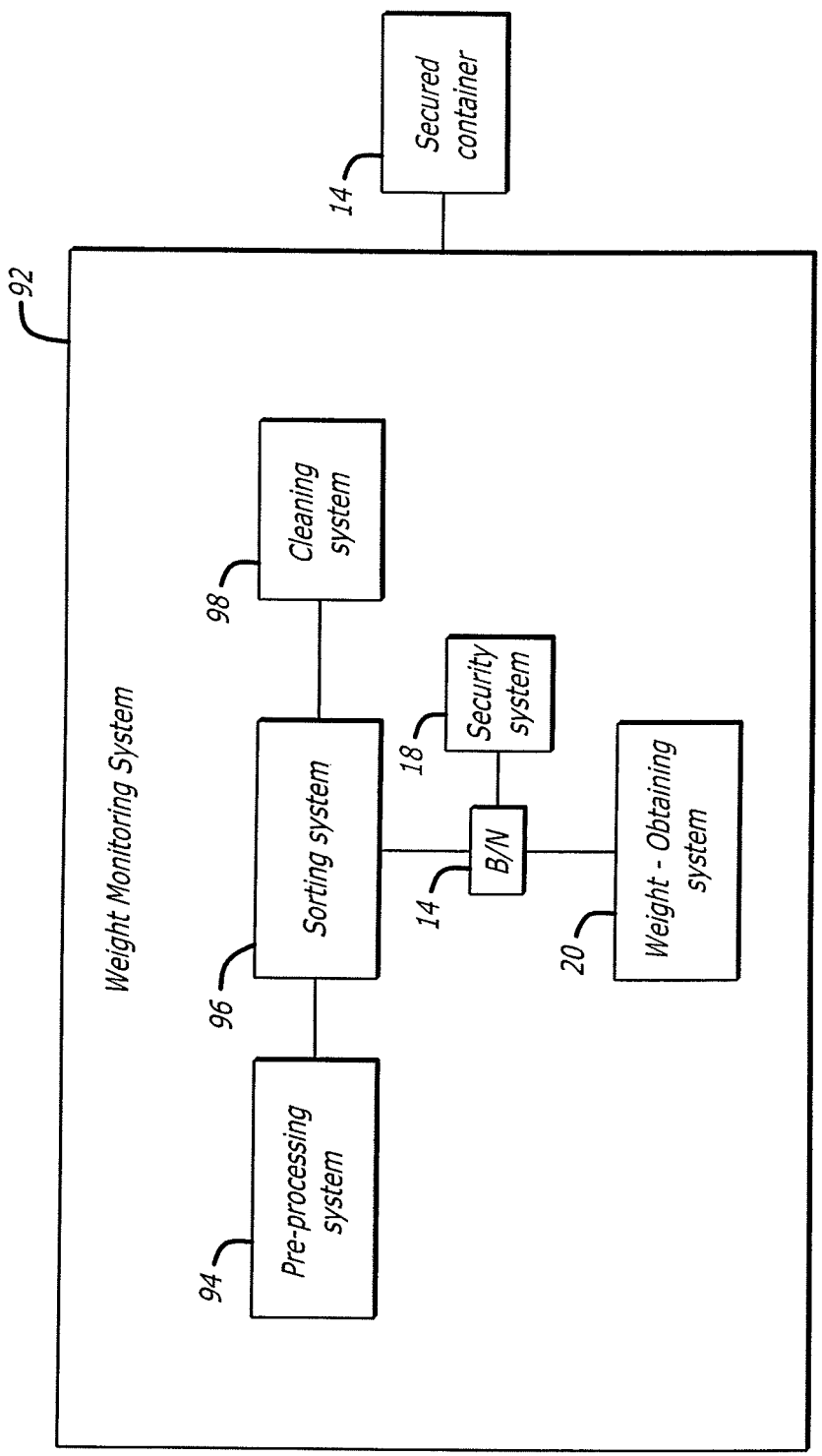
FIG. 9 is a block diagram of a processing system used with a weight monitoring system.

According to another embodiment, the weight monitoring system 10 may include a processing system 92 for processing the material before being loaded into the container 14. The processing equipment provides an additional level of accuracy when determining the weight of the material to be recovered by removing any contaminants associated with the material. As shown in FIG. 9, the processing system 92 may include a pre-processing storage system 94, a sorting system 96, and a cleaning system 98. Once the product is sorted and cleaned, the product is stored within a secured container 14.

In one embodiment, the pre-processing storage system 94 is a bin holding the raw scrap metal. In another embodiment, the pre-processing storage system 94 may be a secured container 14 that is monitored by the security system 18. The secured container 14 and security system 18 ensures that the entire process from recovering, processing and shipping scrap metal is monitored. Accordingly, the pre-processing storage system 94 may include a weight-obtaining system 12 having one or more load sensors 30 to obtain the gross weight of the raw material before processing. Accordingly, if the system 10 monitors the weight of the raw material, net weight of the processed material, and the weight of the waste material, the operator is able to determine if there is any weight discrepancies due to the introduction of foreign substances (e.g., ballast to make the container heavier) or unexplained product loss (e.g., due to theft).

In one embodiment, the processing system 94 includes devices for sorting and cleaning the raw material such as, but not limited to one or more sorting tables, air separators, magnetic separators, or one or more centrifuges. In another embodiment, the processing system 94 includes devices for cleaning or decontaminating the raw material. In yet another embodiment, the processing system 94 includes one or more devices for analyzing the material composition (e.g., alloy analysis) of the raw materials. The processing system 94 may also include one or more devices for changing the form/shape of the raw material. These devices include, but are not limited to, crushers, rotary shredders, centrifuges (for separating liquid from the material), puckers, briquetters, or balers. In yet another embodiment, the processing system 94 includes devices for moving the raw material from one device to another and/or loading the processed product into the container such as, but not limited to, conveyors, augers, or the like.

Figure 10:
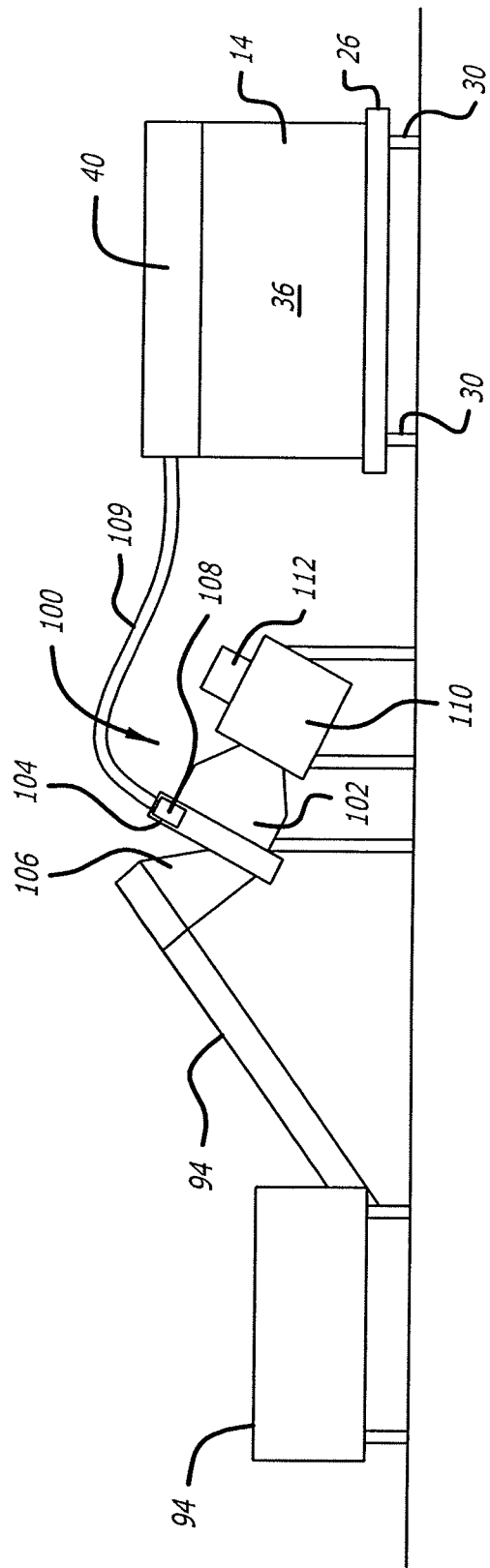
FIG. 10 is a side view of one embodiment of a centrifuge used in the processing system of FIG. 9.

According to one embodiment, a centrifuge 100 is used to separate scrap metal from any associated fluids (e.g., water, coolants, lubricants, oils, water-soluble petroleums, or the like). As shown in FIG. 10, the centrifuge 100 includes a main body 102 tilted at an angle. The angle of the centrifuge 100 allows dry scrap metal to be propelled out of the centrifuge due to centrifugal forces, thereby eliminating the need for a blower to remove dried scrap metal. In one embodiment, the main body 102 of the centrifuge 100 is tilted at an angle of about 38° from horizontal. As those skilled in the art will appreciate, the centrifuge 100 may be oriented at any angle from horizontal to vertical (i.e., 90° from horizontal). Optionally, the centrifuge may include a blower or vacuum to facilitate the removal of dried material from the centrifuge.

As shown in FIG. 10, the main body 102 of the centrifuge 100 is generally conical in shape. A lid 104 secured to the first end of the main body 102. In one embodiment, the lid 104 includes an inlet 106 for receiving unprocessed (e.g., wet scrap metal) within the main body 102 of the centrifuge 100. As shown in FIG. 10, the inlet 106 is positioned around the center of the lid 102. An outlet 108 is positioned tangentially to the outer surface of the main body 102 of the centrifuge 100. When pieces of the scrap metal are dried, the scrap metal becomes airborne and exits out of the centrifuge 100 through the outlet 108. Piping or other conduits 109 are connectable to the outlet 108. In one embodiment, the piping leads to a secured container 14.

As shown in FIG. 10, a housing 110 is connected to the main body 102 of the centrifuge 100. The housing 110 includes the drive mechanism 112 (e.g., motor, driveshaft, transmission, gears, bearings, etc.) for spinning a drum 114 within the main body 102 of the centrifuge 100.

At the base of the main body 102 of the centrifuge 100, an opening 116 is provided to allow the liquids separated from the scrap metal drain from the centrifuge. The fluids may be stored in a pan or one or more containers. The collected fluids may be recycled for use in machining or manufacturing process. Optionally, the collected fluids may be further processed so that the valuable lubricants may be used again. Alternatively, the processed fluids may be sold or returned to a manufacturer or processor.

Figure 11:
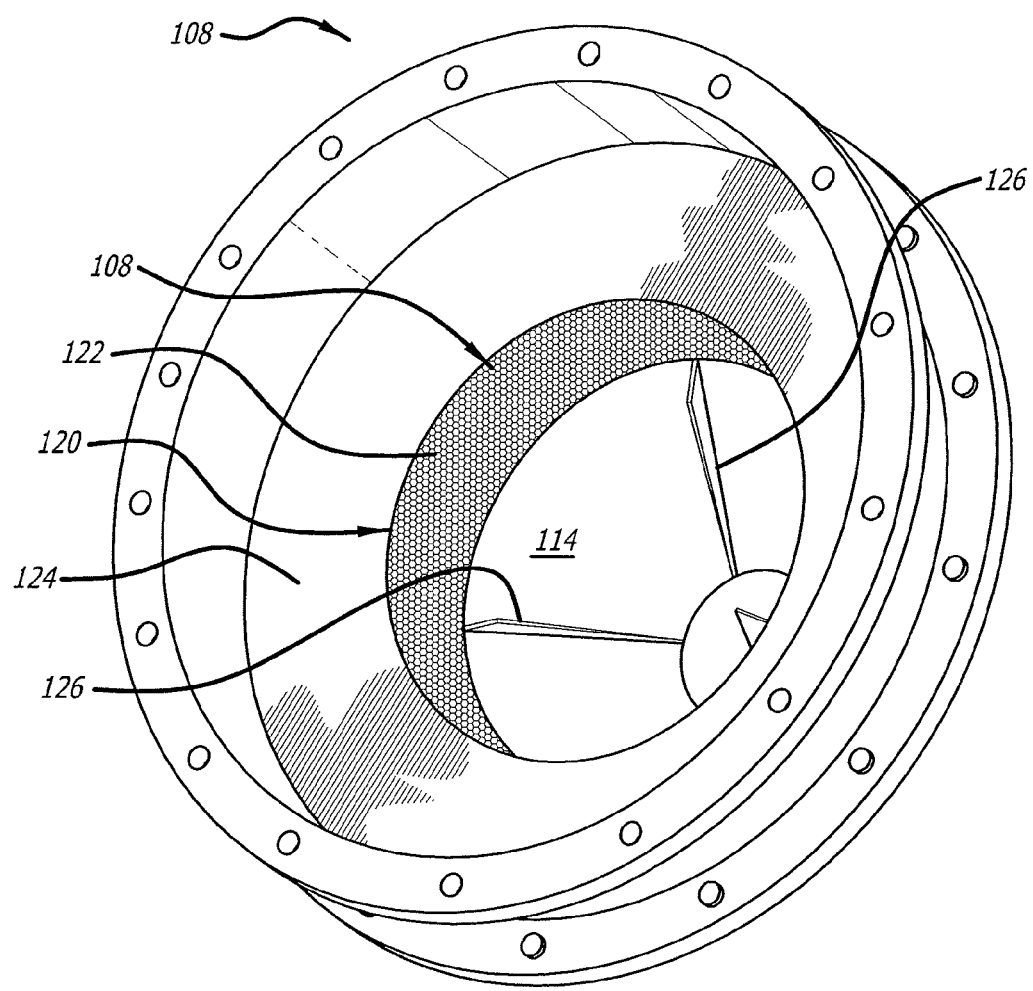
FIG. 11 is a perspective view of the interior of the centrifuge shown in FIG. 10.

FIG. 11 illustrates a rotatable drum 114 that is positioned within the main body 102 of the centrifuge 100. The rotatable drum 114 includes a generally conical body 118. A driveshaft (not shown) or other force transmission element is coupled to the base of the drum 114. A generally circular band 120 having a plurality of openings 122 is positioned at the top of the conical body 118, and a lip 124 is attached to the circular band 120. The openings 122 are used to separate the metal from the fluids. In another embodiment, the entire surface of the drum 114 may include a plurality of openings 122 for separating fluid from the scrap metal. In one embodiment, the lip 124 is generally perpendicular to the generally circular band 120. In another embodiment, the lip 124 is angled relative to the circular band 120. As shown in FIG. 11, one or more paddles 126 protrude from the surface of the rotatable drum 114, but it is also contemplated that other embodiments of the rotatable drum do not include any paddles.

When wet scrap metal is placed within the centrifuge 100, the wet scrap metal drops to the base of the drum 114. As the scrap metal is spun, the liquid moves up the side of the drum 114 and exits through the generally circular band 120. As the metal dries within the drum 114, the pieces of scrap metal become airborne due to centrifugal forces, move up toward the first end of the main body 102, and exit through the outlet 108. The lip 124 prevents any scrap metal from falling back towards the base of the main body 102.

One of ordinary skill in the art will appreciate that not all weight monitoring systems will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. An asset realization system, comprising:
    a system for processing and loading a material into a secured container;
    a weight monitoring system for detecting weight variances of the processed material placed within the secured container;
    a web interface in communication with the weight monitoring system, the web interface capable of obtaining a current value of the processed material; and
    a computer system in communication with the weight monitoring system and the web interface, the computer system adapted to assign and book a current monetary value to the processed material stored within the secured container.

2. A method for realizing assets for a company, the method comprising:
    locking a secured container having a tare weight onto a weight monitoring system, the weight monitoring system including a plurality of load sensors for obtaining and monitoring a weight of the secured container;
    initiating a recovery transaction;
    recovering scrap metal from a site;
    storing the scrap metal recovered from the site within the secured container;
    obtaining a net weight of the scrap metal within the secured container;
    calculating a value of the scrap metal based upon the net weight of the scrap metal and a monetary value of the scrap metal per unit of weight; and
    booking the value of the scrap metal as an asset of the company.

3. The method of claim 2, further comprising verifying identity of the scrap metal by analyzing the scrap metal.

4. The method of claim 2, further comprising
    unlocking and removing the secured container from the weight monitoring system;
    monitoring the secured container with a security system; and emitting a warning signal in response to an intrusion around a predefined area around the secured container.

5. The method of claim 4, further comprising further comprising sending an alert to one or more designated parties in response to the intrusion.

6. The method of claim 2, further comprising:
obtaining the monetary value per unit weight of the scrap metal from selected market indices posted on a website or a designated database.

* * * * *

UNITED STATES PATENT AND TRADEMARK OFFICE
CERTIFICATE OF CORRECTION

PATENT NO. : 8,441,365 B2
APPLICATION NO. : 13/523254
DATED : May 14, 2013
INVENTOR(S) : David H. Jones and Douglas A. Kunnel Page 1 of 1

It is certified that error appears in the above-identified patent and that said Letters Patent is hereby corrected as shown below:

In the Specification:

Column 3, In line 12, add --S-- to "DRAWING"

Column 10, In line 56, change "is" to --are--

Signed and Sealed this
Twentieth Day of August, 2013

Teresa Stanek Rea
*Acting Director of the United States Patent and Trademark Office*